(12) United States Patent
Armon et al.

(10) Patent No.: US 8,510,652 B1
(45) Date of Patent: Aug. 13, 2013

(54) METHOD FOR PERSONALIZING INTERACTION WITH THE WEB

(76) Inventors: Ronnen Armon, Moshav Adanim (IL); Ido Ish-Hurwitz, Kfar Saba (IL); Dror Schwartz, Holon (IL); Yuval Carmel, Tel Aviv (IL); Oren Ariel, Moshav Yarkona (IL)

( * ) Notice: Subject to any disclaimer, the term of this patent is extended or adjusted under 35 U.S.C. 154(b) by 44 days.

(21) Appl. No.: 13/359,112

(22) Filed: Jan. 26, 2012

(51) Int. Cl.
*G06F 17/00* (2006.01)

(52) U.S. Cl.
USPC .................................................. 715/273

(58) Field of Classification Search
USPC .................. 715/234, 251, 243, 273
See application file for complete search history.

(56) References Cited

U.S. PATENT DOCUMENTS

| | | | |
|---|---|---|---|
| 6,850,252 B1* | 2/2005 | Hoffberg | 715/716 |
| 2009/0083232 A1* | 3/2009 | Ives et al. | 707/3 |
| 2009/0249244 A1* | 10/2009 | Robinson et al. | 715/781 |
| 2009/0300480 A1* | 12/2009 | Cohen et al. | 715/234 |
| 2010/0017885 A1* | 1/2010 | Cohen et al. | 726/26 |
| 2010/0070849 A1 | 3/2010 | Sadan | |

* cited by examiner

*Primary Examiner* — Laurie Ries

(57) ABSTRACT

A process of producing personalized applications for a web interaction process in which interface pages are presented sequentially. Learning is applied to the interaction, to subsequently form a sequence of synthetic pages for driving the personalized application. Analysis operation is implemented for analyzing the screen elements, for each respective page, which the user interacts with. This analysis operation lays the foundations for the production of personalized application screen pages. subsequently a vector of synthetic interface pages is produced for applying in the same or on different computing infrastructure.

7 Claims, 7 Drawing Sheets

METHOD FOR PERSONALIZING INTERACTION WITH THE WEB

FIELD OF THE INVENTION

The present invention is in the field of WANs, typically involving server systems for personalising transactions and especially web transactions.

BACKGROUND OF THE INVENTION

A customer logging in a specific website that provides services or offers goods for sale, passes through a sequence of stations together defining a process. That process, referred to hereinafter as a web interaction process (WIP) is to be executed in a specific order while selecting a succession of screen elements in order to achieve a desired end. US patent application 2010/0070849 A1 to Sadan and Glatt, discloses a method for processing a web page and extracting information therefrom in order to reconstruct the web page on a cellular web system.

SUMMARY OF THE INVENTION

A web transaction in the instant disclosure, can be expressed as a sequence of graphic interface page (GIPs) transitions, driven by a sequence of operations. A learning and interpretation procedure in accordance with the invention learns the transitions presentable on a computer screen and constructs an alternative sequence that may be required to be used on a different type of computation infrastructure than the computation infrastructure in which the interpretation procedure was carried out. The personalization of the sequence of transitions is aimed also at providing elevated efficiency for a user while simplifying his/her/its interaction with the system through which the web transaction is implemented.

DETAILED DESCRIPTION OF THE INVENTION

Figure 1:
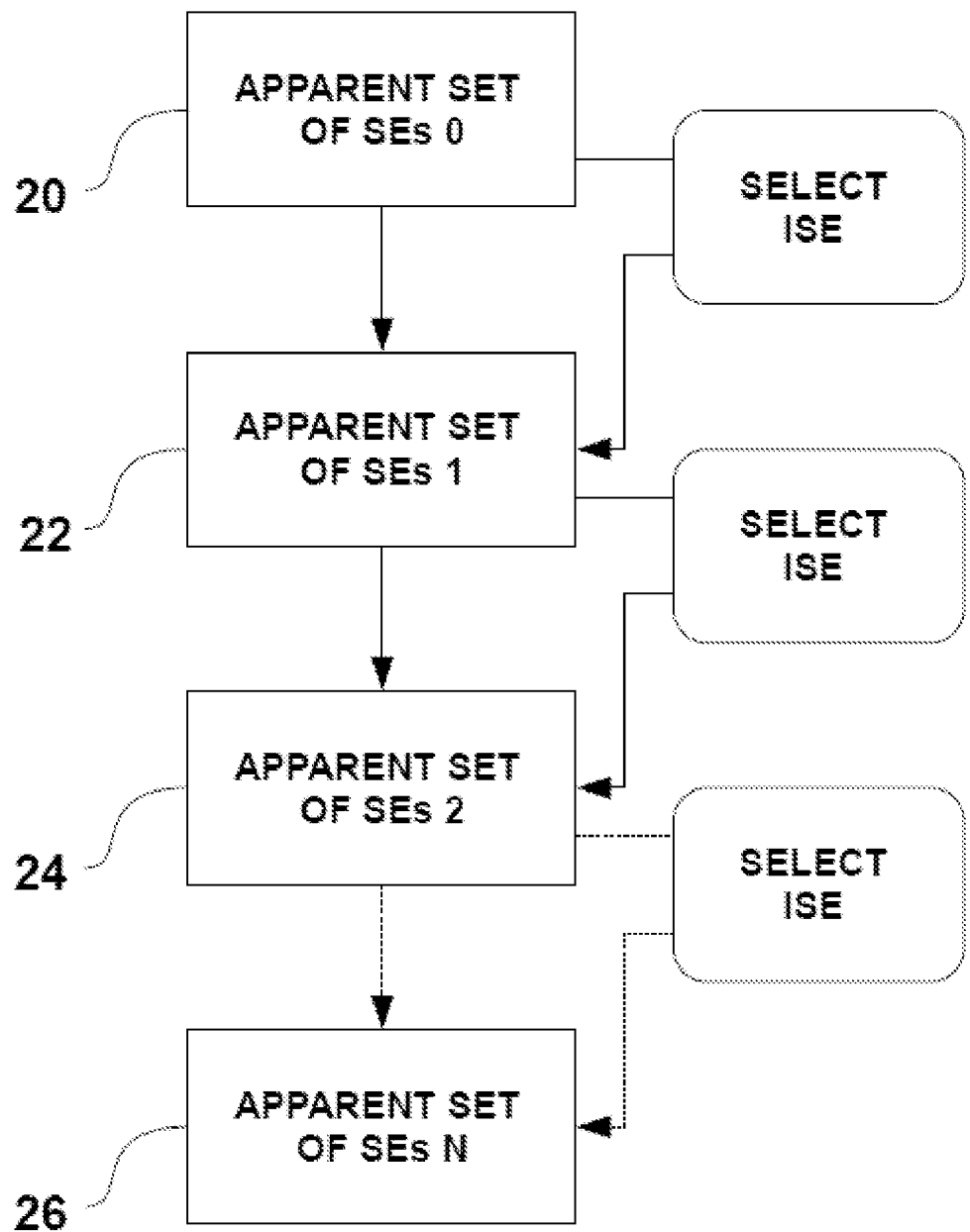
FIG. 1 is a chart schematically describing the time sequence of steps that a customer executes in order to complete a transaction.

In order to carry out a desired interaction with the web such as a transaction, it is typically a user/customer going through a sequence of option selections that he/she implements as described symbolically in FIG. 1. Starting the WIP, the user executes a series of operations made available as via interactive elements on a screen. To explain such an interaction, a schematic course of events is described. First graphic interface page 20, which is for example a web page, displayed by an Internet browser, includes a set of apparent screen elements (SEs) referred to in the figure as SE set 0, some of which may be interactive (ISEs) and some or all may be interrelated to some extent. As a result of the user selecting a specific ISE, a different set of apparent SEs 22 appears, referred to as SE set 1. Subsequently, the user is to make a choice, which is in fact selecting and interacting with an available interactive screen element (ISE), usually one out of the available plurality. As a result of the selection being carried out, a different set of SEs 24 appears, which may be associated with the same GIP having an apparent altered set of SEs or another GIP containing another set of apparent SEs, referred to as SEs set 2. The last set of SEs in the sequence, designated apparent set of SEs 26, exhibits a final set of SE set N that by selecting from which the appropriate ISE, the user can finalize the interaction, or can quit the interaction or else. To continue explaining the implementation of the invention, the term GIP is used in the ongoing description to indicate graphic interface page. It should be stressed at this point that the selection of a ISE does not necessarily change the GIP or the apparent set of SEs on the current GIP.

Figure 2A:
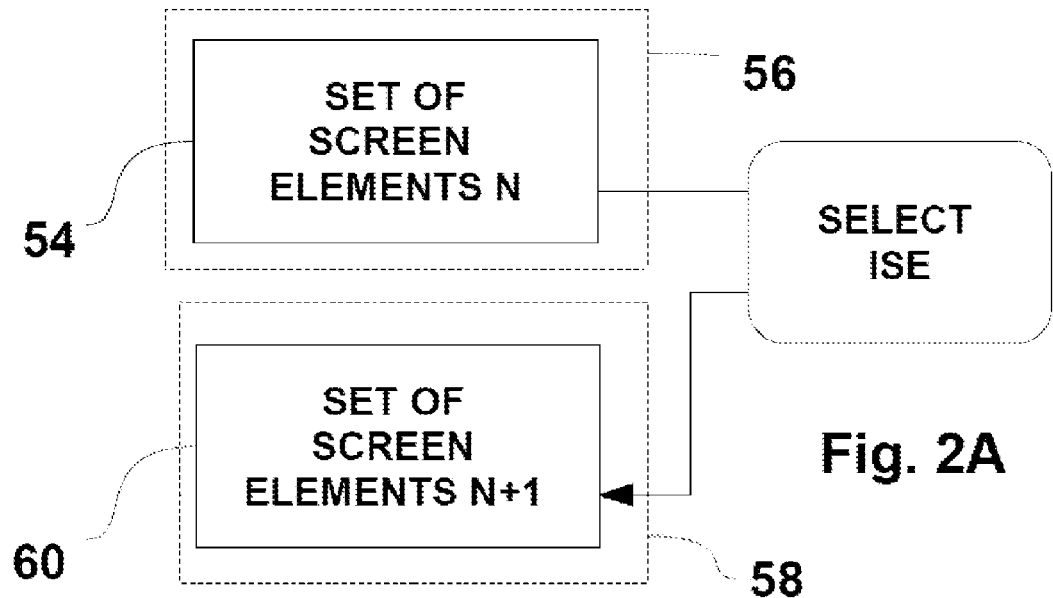
FIG. 2A is a schematic description of one type of graphic interface page (GIP) transition.
Figure 2B:
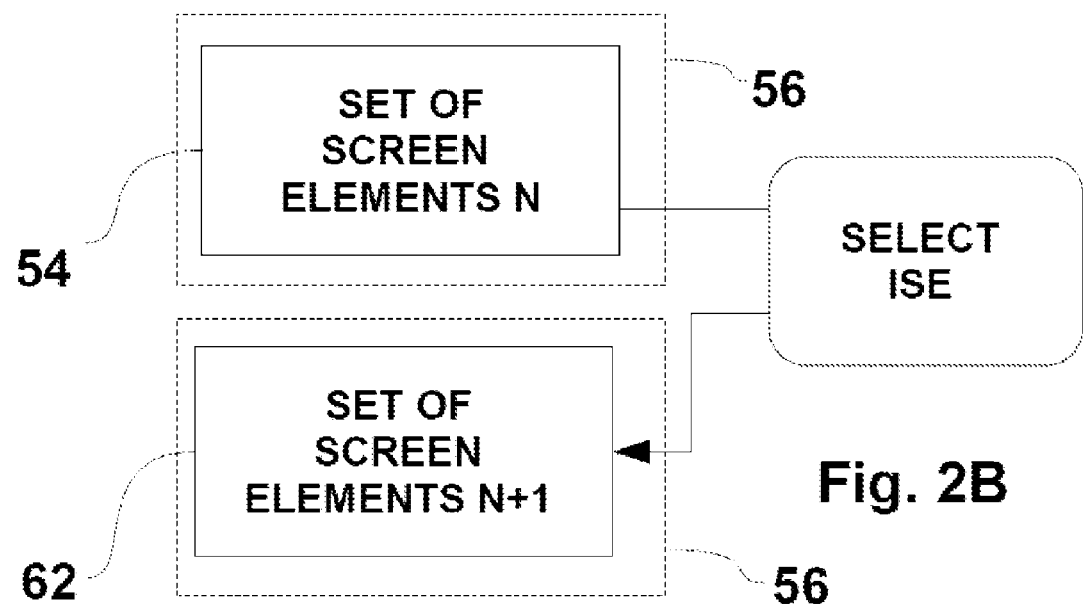
FIG. 2B is a schematic description of another type of GIP transition.
Figure 2C:
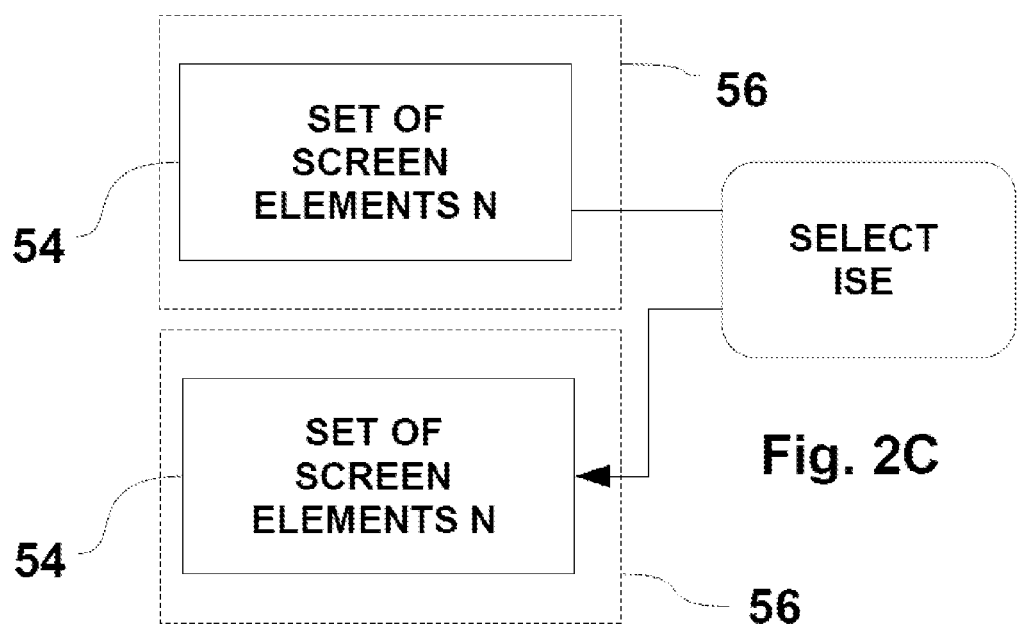

To help explain the types of GIP transitions in the context of the present invention, reference is made to FIGS. 2A-C. In FIG. 2A a set of screen elements N, designated 54 is associated with a GIP which is itself associated with web page 56. When the user selects an option by activating an ISE, the loading of new web page 58 is invoked, with which a set of screen elements N+1, designated 60, is associated. In FIG. 2B, another type of GIP transition is described. Web page 56 is presented as a GIP, together with its own set of screen elements N 54. Interacting with a ISE, the user invokes the reappearance of the same web page 56 as GIP, but demonstrating now a new set of screen elements 62. In yet another example, described schematically in FIG. 2C, Web page 56 is presented as a GIP, having its own set of screen elements N designated 54. As the user activates an ISE, the same GIP 56 remains apparent and the same set of screen elements 54 remains apparent. Some or all the screen elements (SE) are ISEs, such as scroll down lists from which one can select an element, combo boxes radio buttons, and the like. Some of the SE are not necessarily interactive and they do not invoke any further activity as they are activated by the user, such as tables, lists and images. A list of SEs is given at the end of the disclosure.

Automating the Execution of WIPs, an Exemplary Strategy.

A. Learning

To automate the execution of the recurring WIPs, a learning and interpretation procedure (LIP) is employed. To explain in general terms the functionality of the LIP, reference is made first to FIG. 3 in which the LIP applies analysis of the screen elements of the respective GIPs 72 as they appear as a result of an activation of a ISE by the user. Further aspects of the LIP will be described later on. The analysis operation 80 is applied to each of the data sets derived from the respective GIPs, consecutively as they appear. Further learning steps are to be dwelt upon below, in the analysis section.

B. Creating an Automated Transaction Application

The personalized process application (PPA), can be created while the LIP is running or after the LIP has terminated for a specific WIP session. The role of the PPA is to receive and interpret a succession of option selections from a variety of entities such a user or a computer program and run the WIP to achieve the desired end.

Figure 4:
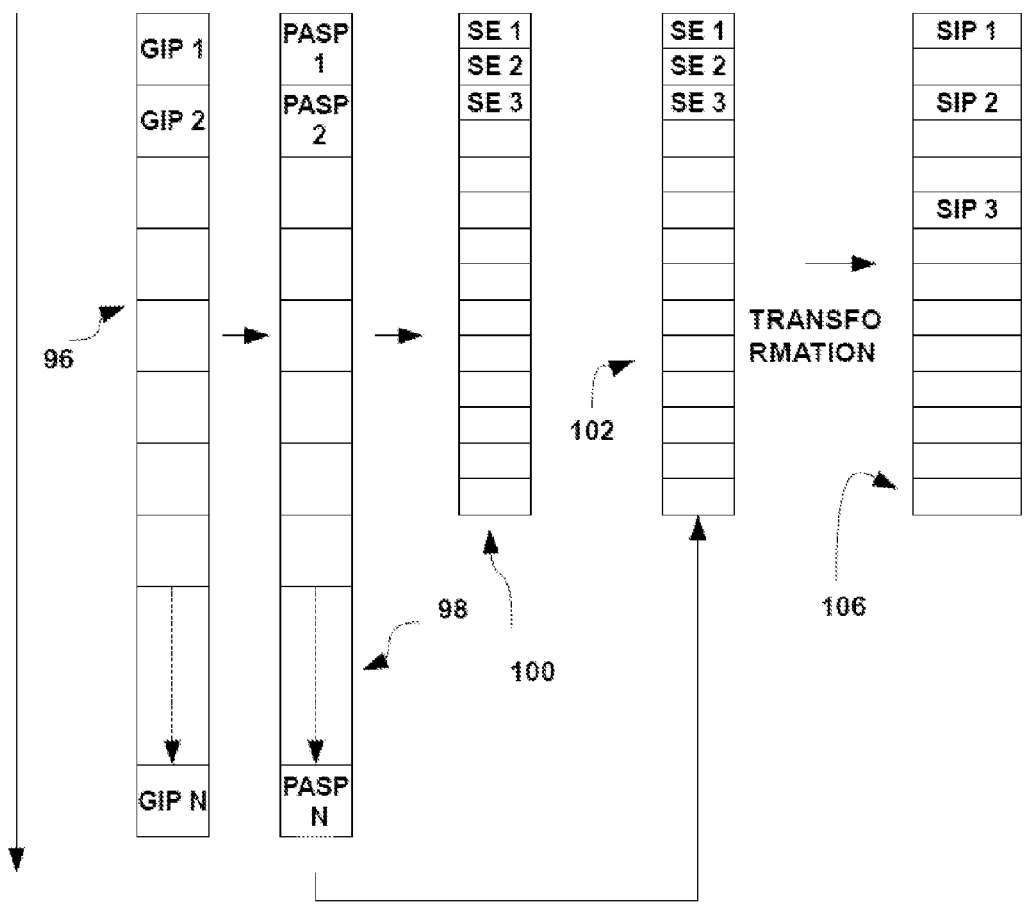
FIG. 4 is a schematic vector presentation of GIPs, their converted counterparts (PASPs), and vectors of screen elements derived from them.

Reference is now made to FIG. 4 which depicts the series of processes taking place while the PPA for a WIP session is created. In a time vector notation, vector 96 includes all the GIP tracked by the LIP. The LIP compiles a vector 98 of converted GIPs, referred to hereinafter as personalized application screen page (PASP), which contain only the screen elements relevant to the user interaction. Thereafter, vector 98 is further processed to create vector 100 which contains all the screen elements (SEs) selected by the LIP and the information regarding their interrelationships as will be discussed below. It should be noted at this point that vector 96 may give rise to a multiplicity of screen elements vectors, such as vectors 100 and 102. The transformation from the PASP vector to the synthetic interface pages or screens (SIP) vector will be discussed below after explaining the analyses made by the LIP. However, it remains to be said at this point that the PASP vector need not be transformed right away to a SIP vector, and the user/s may choose to effect a transformation at a time suitable for them, such as before a decision is made as to how many infrastructures the transformation will be effected. A user may also use a PASP for producing a SIP on the same infrastructure, when the PASP vector is available or later on. A user may also be predisposed for transferring the SIP or a PASP to secondary users, for whatever infrastructure they may be using.

C. Characterizing the Screen Elements

Figure 3:
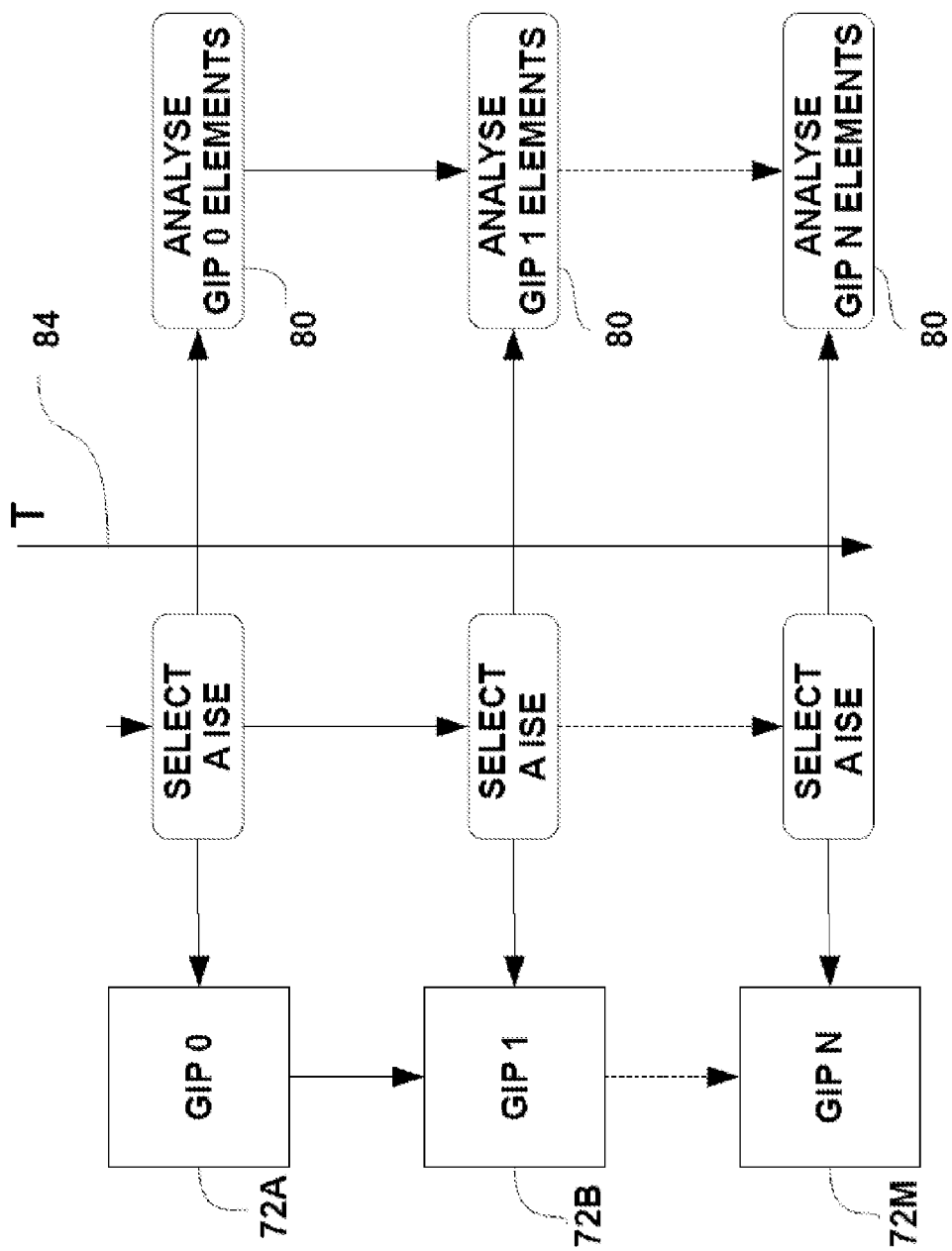
FIG. 3 is a combined sequence chart and block diagram describing the sequential bringing about of a learning and interpretation procedure (LIP)
Figure 5:
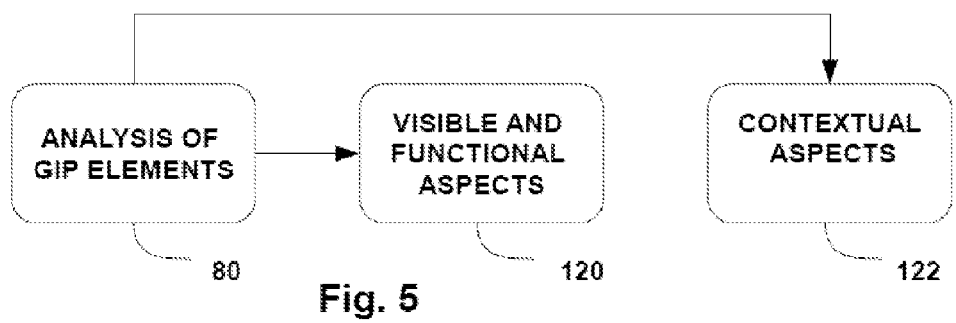
FIG. 5 is a schematic representation of the two complementary analytical tasks carried out on GIPs in accordance with the present invention.

Referring to FIG. 3 again, analysis of the GIP elements is shown as being carried out consecutively on the time axis 84, each consecutive GIP at its own turn. Before continuing to explain how the analysis is performed, a more thorough explanation of SEs in the context of the present invention follows. As discussed above, some of the screen elements are informative and interactive, illustratively, the user is invoked by a screen element to perform an action which he/she as a result performs on the same SE, such an SE is therefore interactive (ISE). Some screen elements on the other hand are only informative and do not react to any activation. A third type of SE in the context of the present invention is an exclusively interactive type, in other words such element lacks the informative aspect but reacts to the action of the user or a program. In order to find the elements which influence choice making and decisions of the user confronted by each GIP, the analysis is to find all SEs which may be of interest to the user in the context of what he or she is trying to accomplish by interacting with the application, be they informative elements or reactive elements or a combined type. The analysis operation schematically related to in FIG. 3 is further described in more detail in FIG. 5. The interaction of the user with the GIP is subjected to analysis in two different aspects. Analytical aspect 120 is the classification of a screen element, notably the one reacting as invoked by the user, with respect to its visible and functional aspects. Such features of the ISE are typically expressed in terms of software definitions, typically HTML definitions. For example the so called "radio button" is a known graphic element which reacts typically in a response to being clicked upon. And the user expects to bring about some sort of activity as a result, for example bringing forth another page. Analytical contextual aspect 122 of the GIP elements analysis operation relates to the meaningful placement of the respective SEs, be they reactive or informative within the GIP. Thus, a radio button, that has a certain set of visible and functional properties, may be juxtaposing a SE which is solely informative but the location of which is essential for letting the user know what to do with the other, interactive SE. In another example, a non-interactive SE has to be placed in the top of the page in order to convey a sense of generality to its properties which refer to all the other SEs in the GIP. Therefore aspect 122 may bundle different SEs together and also may indicate a meaningful docking of specific SE or SE bundles to a relative location in the GIP. Such features are also typically expressed in terms of HTML software language. Next, the characteristics of the GIP transition are analysed using information about screen elements collected and analyzed by the LIP.

Figure 6:
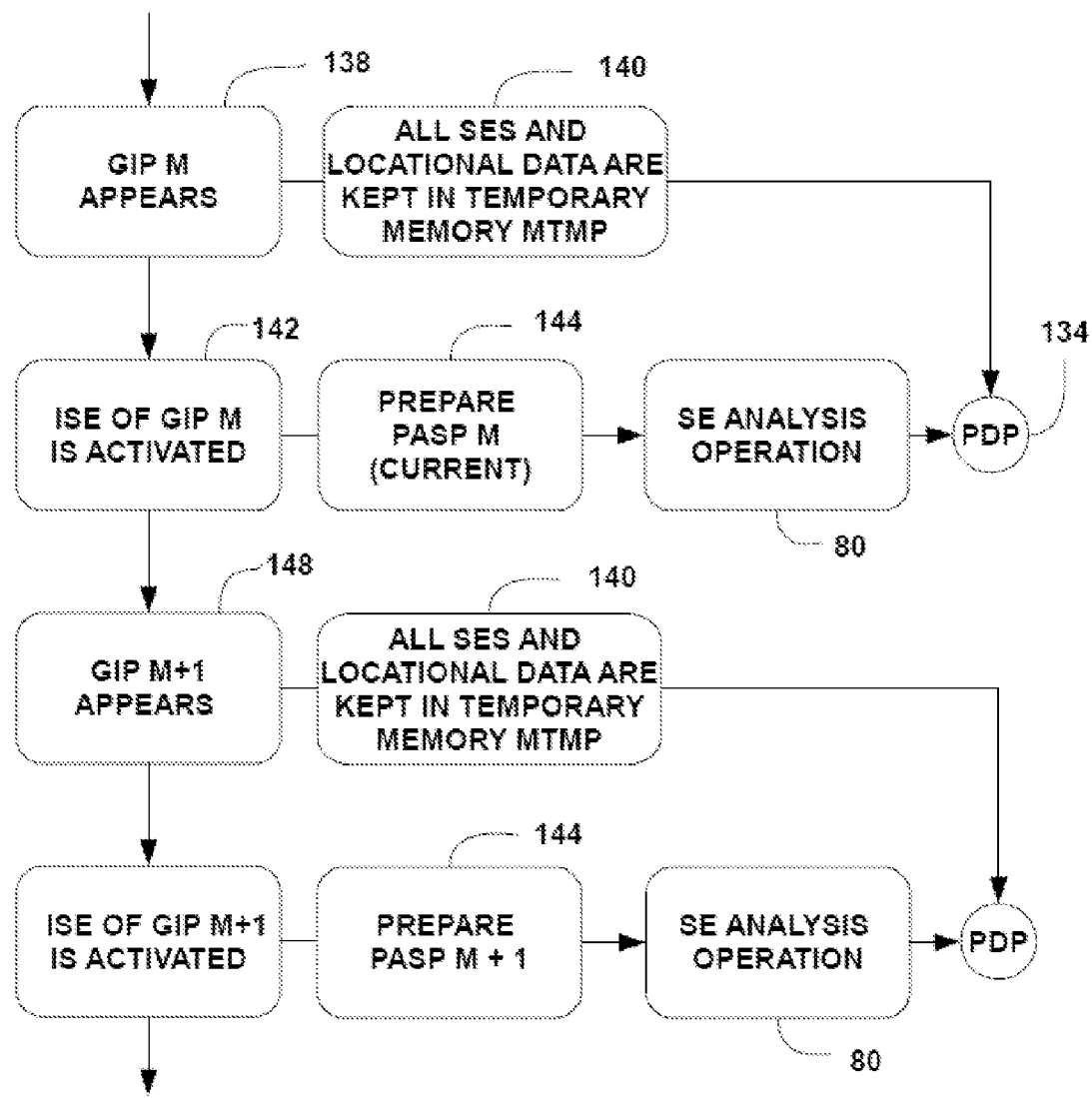
FIG. 6 is a schematic representation of the stepwise nature and analytical tasks at different states of the execution of web interaction process.

D. Derivation of PASPs from Respective GIPs and the Four PASP Derivation Policies The PASP derivation procedure (PDP) 134 is a procedure that derives a sequence of PASPs from the sequence of GIPs in a WIP session. There are four implementable derivation policies. In a first policy, the PASP derived reflects the fact that it has not shown up in the session before. In a second policy, a PASP reflects the fact that an existing PASP in the session is reused. In a third policy, a PASP is used reflecting the fact that it is a clone of the former PASP. In a fourth policy, the PASP used reflects the fact that no new PASP is formed, and the former PASP is kept as current. The policies will be explained in more details below. The steps applied in the implementation of PDP are described with reference to FIGS. 6-7. The PDP provides foundations for the eventual transformation of a PASP to a SIP, accepting data from the SE analysis operation following or during the running of the WIP session. First, referring to FIG. 6, in a WIP session, as a GIP appears in step 138, all the SEs and their respective locational information are kept in a temporary memory at step 140 to potentially be used later on. Besides that, when the information has been stored, the GIP may be interacted with by the user at step 142. Specifically, the user can select a ISE, activate it and all the changes, if any, in SEs and associated contextual data are used in the preparation of a new PASP at step 144. Independently, a subsequent GIP M+1 appears at step 148. The ISE which has been interacted with the user and caused the appearance of a subsequent GIP is referred to hereinafter as "activated ISE", in short AISE. PDP 134 performs based also on the analysis of the respective SE as provided by respective instances of the SE analysis operation 80.

Figure 7:
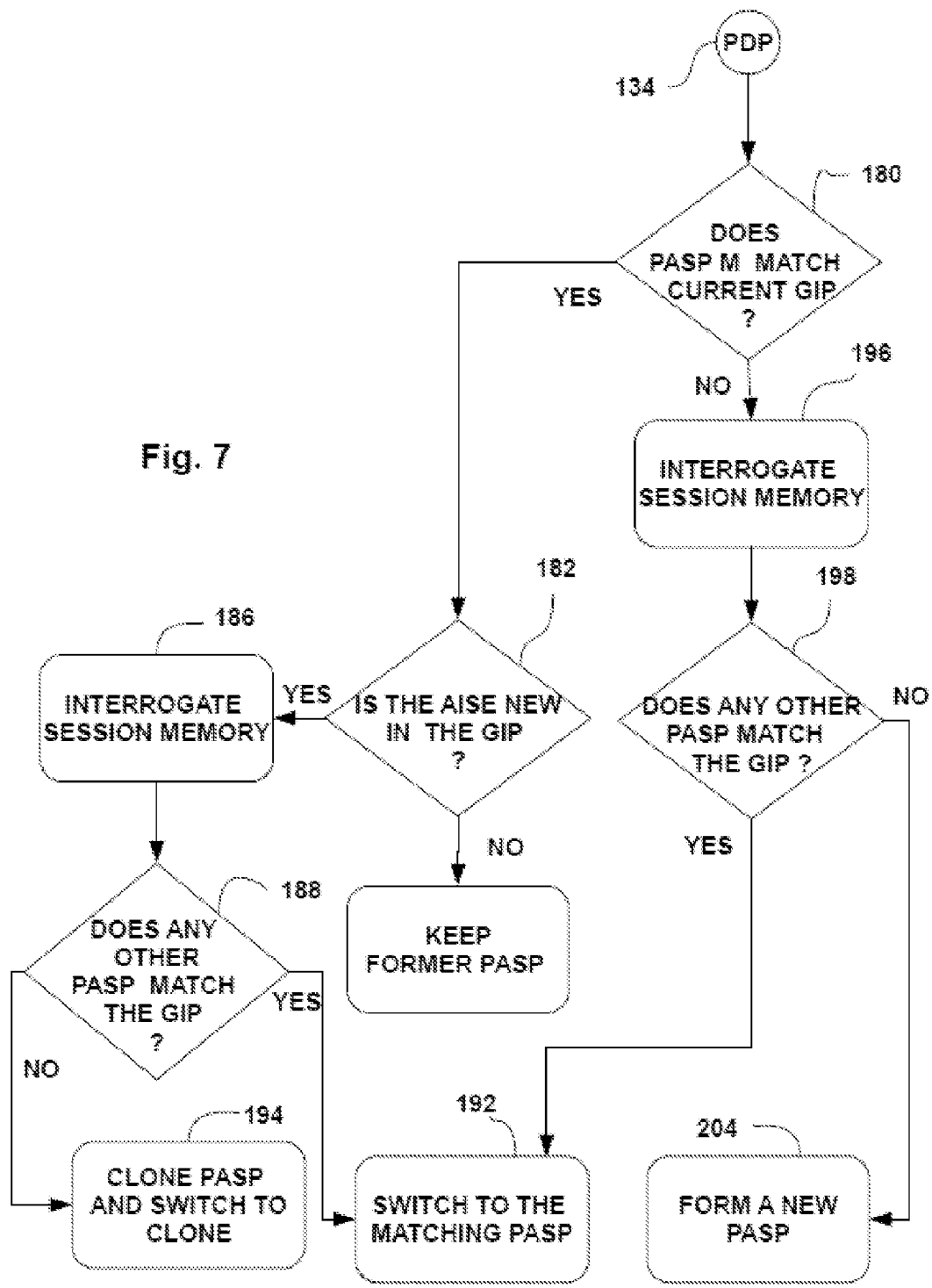
FIG. 7 is a schematic representation of the sequential decisions which dictate the characteristics of entities symbolically interpreting the graphic interface pages.

In FIG. 7 the fundamental decisions which PDP 134 makes in one embodiment of the invention in order to characterize PASP M, which is the currently produced PASP are described. It should be pointed out at this stage that a PASP may appear in a certain session more than once. First, in step 180, the PDP matches the properties of PASP M with those of GIP M as stored in memory MTMP. If they do, then subsequent verification step 182 is applied in which PDP checks if the AISE is new in the memory MTMP, meaning that it appears for the first time in the current GIP, if the AISE in the MTMP has already shown up in a previous GIP, then a PASP is not formed and current PASP is used (policy 4). If the AISE in the PASP is new with respect to the MTMP, then at step 186 session memory is interrogated, and if in step 188 any PASP is found as matching GIP M, then that specific PASP is copied in step 192 for re-use, it is referred to as a clone (policy 2). If in step 188 no PASP is found matching the data in the MTMP, the current PASP is cloned to be used as current PASP at step 194 (policy 3). Going back to verification step 180, if the data in MTPM finds no match in the activated GIP M, the PDP interrogates the session memory in step 196. Then if a PASP is found that matches the MTMP data at step 198, it is used as a next PASP in step 192 (policy 2). If not found, a new PASP is formed which has never been before in the session, at step 204 (policy 1). In each of the policies, the AISE is added to current PASP.

Creating respective synthetic interface pages and synthetic WIPs.

Referring now to FIG. 4 again, vector 102 containing all relevant screen elements derived from a specific WIP and their contextual properties. In the following step, the vector is parsed to create synthetic interface pages (SIPs). Vector 106 containing all the SIPs of a specific WIP is stored and typically transferred to a network made available for the user. The SIPs may or may not be viewable by the user. The decision whether to make a SIP available for a user is reflects among other considerations the need of the user to access a screen element for example to modify a parameter of the element. This shows that running the PPA is either uninterrupted or interrupted. It is noted that more than one SIP may be applied to reach the same final GIP.

The LIP is typically implemented at a learning end-point of a WAN and once processed, the SIPs of vector 106, become expressed and available in a form familiar to professional people, independent of a computer infrastructure (hardware and software), and can thereafter be transferred to other computer infrastructures. Typically, the LIP is implemented at an end-point such as an office terminal of a WAN and once processed, the SIP of vector 106, becomes an application available to a user over a wireless cellular Internet, to be implemented in a cellular telephone such as a smartphone.

A Nonexclusive List of Screen Elements Usable in the Context of the Invention.

Button, link, text-box, check-box, radio buttons, list-box, combo-box, date-picker, slider, list, table, form, menu, and tab.

What is claimed is:

1. A process of producing personalized application for a sequential web interaction process performed recurrently, whereby learning is applied to said sequential interaction performed with interface pages, to subsequently form a sequence of synthetic pages for driving said personalized application, said process comprising:

following the sequence of pages shown on a screen of a user in a session of a network interaction process;

implementing an analysis operation for analysing the screen elements, for each respective page, which said user interacts with and or may influence the choices made by said user with respect to both functionality and contextual placement within the screen;

wherein said analysis operation lays the foundations for the production of personalised application screen pages;

implementing a derivation procedure in order to derive personalised application screen pages that reflect the characteristics of said sequence of pages shown on a screen of a user screen pages, and producing of a vector of synthetic interface pages.

2. A process as in claim 1, wherein said derivation procedure of said personalised application screens implements either one of four derivation policies within each session of the process:

the new personalised application screen page (PASP) reflects the fact that it has not shown up in the session before;

the new personalised application screen page (PASP) reflects the fact that a PASP already existing in the session is reused;

the new personalised application screen page (PASP) reflects the fact that a new PASP is a clone of the former PASP in the session, and the new personalised application screen page (PASP) reflects the fact that no new PASP is made, while the old PASP is kept as current.

3. A process as in claim 1, wherein said personalised application screen pages are expressed as independent of a computerized infrastructure and are transferable to a computerized infrastructure different than the one they were produced in.

4. A process as in claim 3 wherein synthetic interface pages are produced from a vector of screen elements, transferable to at least a second computerized infrastructure.

5. A process as in claim 4 wherein said second computerized infrastructure is a cellular based Internet service using a wireless cellular internet using a cellular phone.

6. A process as in claim 4 wherein said synthetic interface pages produced from a vector of screen elements, are transferable to an infrastructure different than the first computerized infrastructure in which they were produced.

7. A process as in claim 1 wherein said user is either a person or a computer program.

* * * * *